United States Patent [19]

Ridgeway

[11] 4,102,964
[45] Jul. 25, 1978

[54] METHOD FOR MANUFACTURING RIGID ARTICLES HAVING A CUSHIONED SURFACE

[75] Inventor: Louis H. Ridgeway, Jonesville, S.C.

[73] Assignee: Facetglas, Inc., Rock Hill, S.C.

[21] Appl. No.: 696,879

[22] Filed: Jun. 17, 1976

Related U.S. Application Data

[63] Continuation-in-part of Ser. No. 535,678, Dec. 23, 1974, Pat. No. 4,069,523.

[51] Int. Cl.² .................... B29C 17/04; B29D 3/02; B29D 9/00
[52] U.S. Cl. .................... 264/92; 264/46.8; 264/255; 264/309; 264/321; 425/388
[58] Field of Search ............ 264/89, 90, 92, 46.8, 264/255, 297, 129, 309, 321; 425/104, 388

[56] References Cited

U.S. PATENT DOCUMENTS

| | | |
|---|---|---|
| 3,044,117 | 7/1962 | Alspach et al. ............ 425/104 X |
| 3,190,945 | 6/1965 | Diamond ............ 425/388 X |
| 3,226,458 | 12/1965 | Gräff et al. ............ 264/90 |
| 3,711,581 | 1/1973 | Fowler, Jr. et al. ............ 264/46.8 X |
| 3,720,540 | 3/1973 | Wimmer | 
| 3,751,540 | 8/1973 | Prahl, Jr. et al. ............ 264/92 X |
| 3,809,739 | 5/1974 | Gelin ............ 264/297 |
| 3,816,234 | 6/1974 | Winfield | 
| 3,841,819 | 10/1974 | Diamond ............ 425/388 |

*Primary Examiner*—Jan H. Silbaugh
*Attorney, Agent, or Firm*—Wellington M. Manning, Jr.; Luke J. Wilbrun, Jr.

[57] ABSTRACT

Method for manufacturing rigid articles having a resiliently deformable cushioned surface in a vacuum forming operation wherein a drapable sheet of resiliently deformable cushioning material is vacuum formed into a desired shape on the shaping surface of a vacuum forming mold, and wherein vacuum is maintained on the mold to retain the sheet in dimensionally fixed configuration on the shaping surface while the exposed surface of the sheet is intimately bonded to a rigid support layer to provide a rigid cushioned article. The apparatus used comprises an assembly line including a portable vacuum forming mold which is transported between spaced treating stations on the assembly line while at all times maintaining vacuum on the mold to retain the cushioning material in dimensionally fixed configuration until intimately bonded to and rigidized by a layer of supporting material.

5 Claims, 3 Drawing Figures

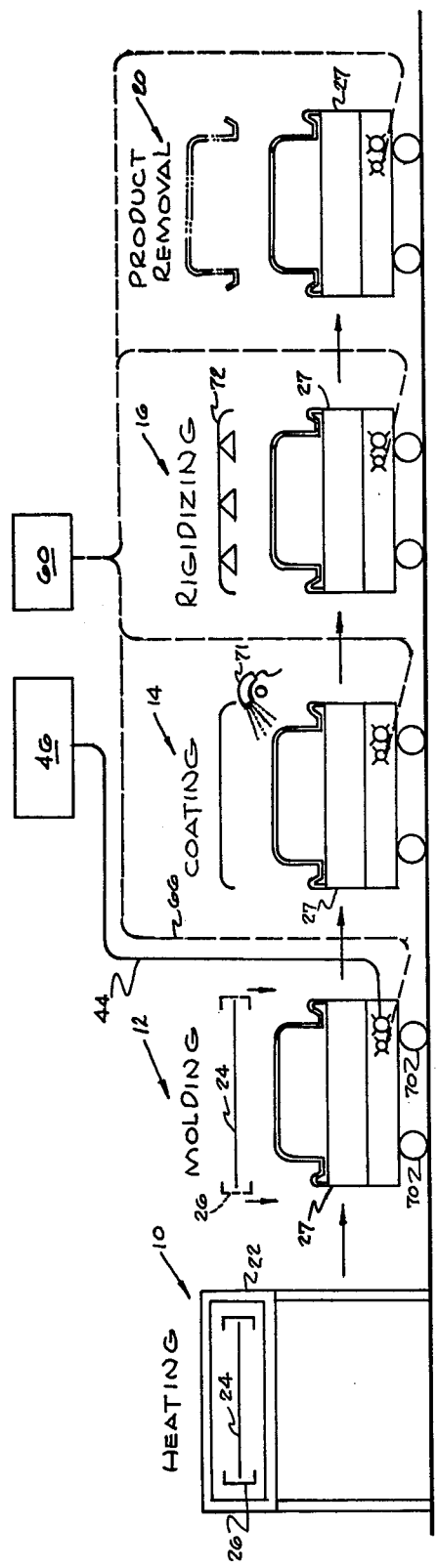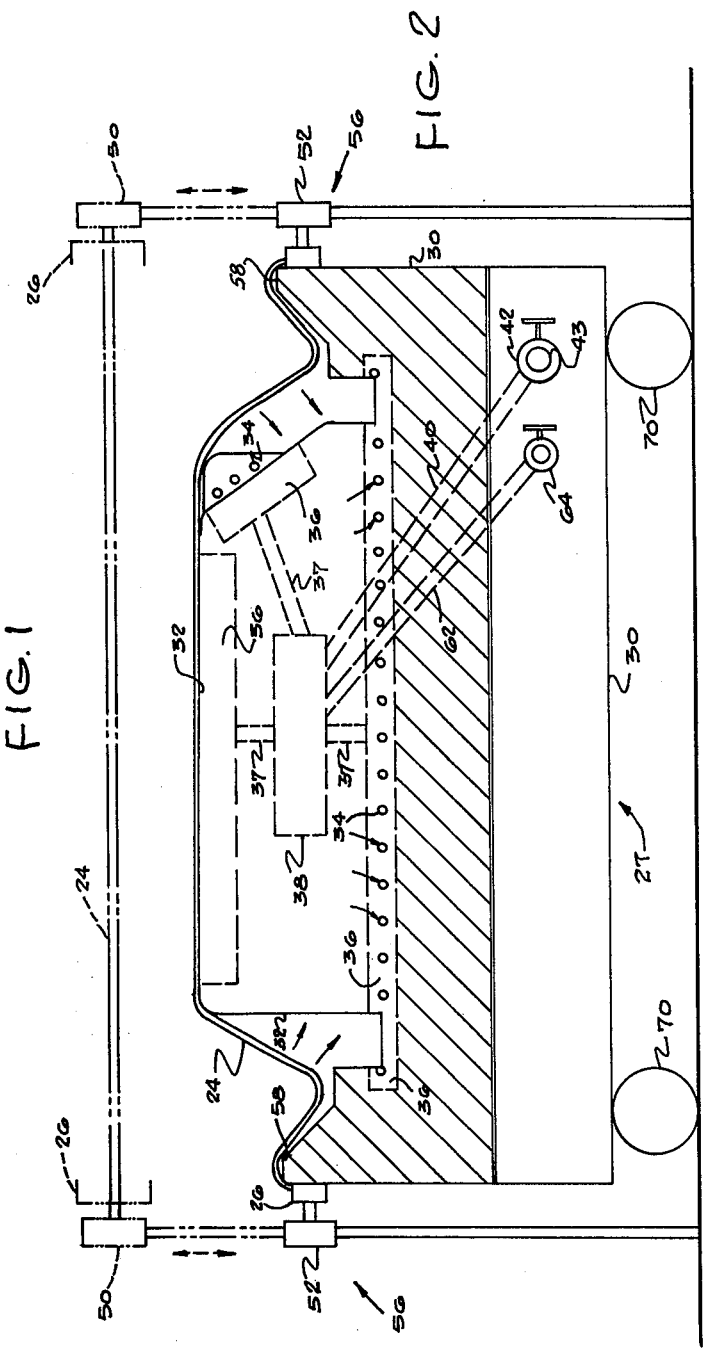

METHOD FOR MANUFACTURING RIGID ARTICLES HAVING A CUSHIONED SURFACE

The present invention is a continuation-in-part of my co-pending U.S. Pat. application Ser. No. 535,678, filed Dec. 23, 1974 now U.S. Pat. No. 4,069,523 and is directed to method and apparatus for producing rigid shaped articles having a cushioned surface. More particularly, the invention is directed to method for molding cushioned bathware products, such as tubs, shower stalls, basins and the like.

Cushioned bathware products formed of laminated polymeric materials are known. My aforesaid co-pending U.S. patent application discloses one such bathtub construction comprising a rigid outer shell of plastic foam material having a soft, water-impervious layer of foam material intimately bonded thereto. U.S. Pat. No. 3,816,234 also discloses bathware structures constructed of a rigid support layer having an impact-absorbing surface layer of polymeric foam adhesively bonded thereto. Such cushioned bathware products provide greatly improved comfort and safety for users, and possess excellent thermal insulating characteristics.

It is known to produce rigid plastic bathware fixtures, such as tubs and shower stalls, in a thermal forming operation wherein a relatively rigid sheet of thermoplastic material, such as an acrylic resin, is heated to its thermal forming temperature, vacuum molded into a desired shape, removed from the mold, and subsequently coated on its outer surface with a fiber-containing resin to impart additional strength and dimensional stability to the product. Such fixtures and their method of construction are described in U.S. Pat. Nos. 3,720,540, and Reissue 27,430.

The present invention is directed to a method of manufacturing cushioned rigid articles, such as bathware fixtures, in a vacuum forming operation wherein a drapable sheet of soft, cushioning material having a water-impervious outer skin or surface layer is vacuum-shaped into a desired configuration and thereafter bonded to a rigidifying layer of material.

In vacuum forming, non-rigid, drapable sheets of cushioning materials which are to be rigidified in a subsequent coating operation, many problems are encountered. Since such drapable sheets do not become self-supporting in shape after forming, it is extremely difficult to maintain the sheets in the desired shape until they are dimensionally stabilized by bonding to a rigid layer of material. In addition, if the cushioning material is a thermoplastic foam, it has an inherent tendency to dimensionally shrink during cooling after shaping. Differential shrinkages can also occur in the sheet material as a result of the differential stresses placed on the sheet during the molding operation. Further, when the cushioning material is composed of multiple layers or components, such as when the cushioning layer is laminated to a thin sheet or film of plastic to provide a smooth outer skin, differential shrinkage can occur between the cushioning layer and the plastic skin during the molding operation.

It is therefore an object of the present invention to provide an improved method for manufacturing rigid shaped articles having a soft, resiliently deformable cushioned surface in a molding operation which eliminates the aforementioned problems occurring as a result of the nature of the cushioned materials being molded.

It is a further object of the present invention to provide an improved method for commercially producing molded cushioned articles formed of polymeric materials in a rapid, efficient, and economical manner.

It is another object of the present invention to provide an improved assembly line method for the molding of rigid products having a cushioned surface.

In its broad aspects, the method of the present invention comprises the steps of shaping a drapable sheet of resiliently deformable cushioning material into a desired configuration on a vacuum-forming mold, and maintaining vacuum on the mold to retain the sheet in dimensionally fixed configuration until the exposed surface of the sheet is intimately bonded to a rigid support layer. By maintaining the sheet in fixed configuration on the mold until dimensionally stabilized, the problems of support and irregular shrinkage of the sheet are eliminated.

To facilitate the practice of the method in a continuous and efficient commercial operation, the invention includes improved vacuum molding apparatus which may be effectively transported between treating stations of a commercial assembly line while maintaining vacuum at all times on the mold until removal of the final rigidized product.

The above as well as other objects and features of the present invention will be better understood from the following detailed description of the method and apparatus as employed in the commercial production of a cushioned bathtub, and as illustrated in the accompanying drawings, in which:

FIG. 1 illustrates diagrammatically an assembly line for performing the sequential steps of the present method in the commercial production of a cushioned bathtub;

FIG. 2 is a side elevation of a portable vacuum-forming mold, with associated sheet supporting and conveying equipment, a portion of the mold being shown in section taken along line II—II of FIG. 3.

Figure 3:
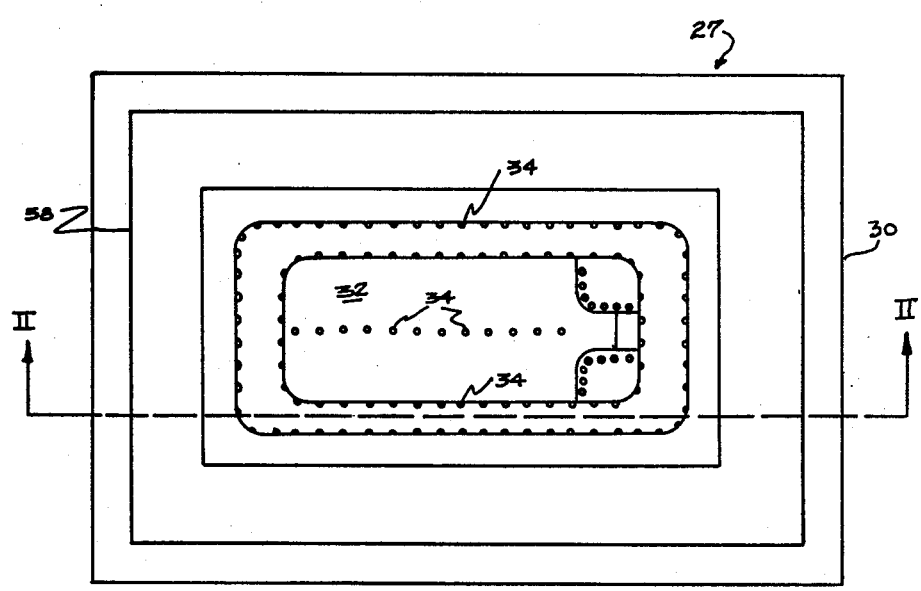
FIG. 3 is a plan view of the vacuum mold of FIG. 2.

As seen in FIG. 1, the commercial production line for forming a cushioned bathtub includes a plurality of spaced treating stations comprising heating station 10, a molding station 12, a coating station 14, a rigidizing station 16 and a product removal station 20. Heating station 10 comprises a heating oven 22 and an associated sheet conveying mechanism for introducing and removing a sheet of thermally formable material from the oven and for transporting the sheet onto the shaping surface of a vacuum forming mold located at the molding station 12 adjacent the oven. The oven and conveying mechanism are of conventional type well known in the art of thermal forming plastic sheet materials and the specific details thereof form no part of the present invention. At heating station 10, a drapable sheet of resiliently deformable, water-impervious foam material 24 is supportably clamped about its periphery in a rectangular frame 26 and is inserted into the oven 22 and heated to its appropriate thermal forming temperature. Upon reaching the desired temperature, the frame containing the sheet is removed from the oven by the conveying mechanism and lowered about the shaping surface of a vacuum forming mold 27.

The vacuum forming mold 27 of the present invention, which is best seen in FIGS. 2 and 3, comprises a rectangular support box or frame 30 having a generally convex male shaping surface 32 mounted thereon. As shown, the shaping surface 32 has the configuration of the internal surface of a bathtub and is constructed of a rigid material of sufficient strength to be employed in a vacuum forming operation. Typically the molding surface may be constructed of an apoxy resin reinforced with fiberglass. Shaping surface 32 is provided with a plurality of vacuum inlets, or holes 34, which communicate with adjacent chambers 36 shown in phantom lines, on the interior of the mold. The individual chambers 36 are connected by suitable conduits 37 to a central manifold 38 which is connected by a main internal conduit 40 with a primary valve 42 located on the support box 30. Valve 42 is provided with a quick coupling connection 43 and communicates by way of a flexible hose 44 with a primary source of vacuum, such as a main vacuum pump indicated diagramatically at 46 in FIG. 1.

At molding station 12, clamping frame 26 containing the heated foam sheet 24 is lowered over the shaping surface 32 from an upper position 50 (shown in phantom lines) to a shaping position 52 by the conveying device (indicated schematically at 56). As the heated sheet is stretched over the shaping surface by downward movement of the frame, vacuum is applied to the mold to withdraw air from between the sheet and shaping surface and intimately conform the sheet to the surface. In lower molding position 52, the clamping frame peripherally surrounds the shaping surface in close conformity with the sides of support box 30 and an air tight seal is created between the sheet and surface 32 at the peripheral edges 58 of the mold.

When the air is evacuated between the sheet and mold surface to intimately conform the sheet to the surface, the central manifold 38 of the mold is connected to an auxiliary source of vacuum or vacuum pump 60 (FIG. 1) by way of an auxiliary internal conduit 62, external valve 64, and flexible hose 66. Valve 64 is opened and primary valve 42 can then be closed and the flexible hose 44 disconnected therefrom. Auxiliary vacuum pump 60 is sized to maintain sufficient vacuum on the interior of the mold to retain the sheet in intimate contact with and in dimensionally fixed configuration on the surface of the mold at all times during its transportation to the subsequent treating stations 14, 16 and 20.

As seen in FIG. 2, the support box 30 is mounted on rotatable elements, or casters 70, to permit the mold to be rolled along the floor surface from molding station 12 to coating station 14, rigidizing station 16, and product removal station 20 while connected to the auxiliary pump 60 by the flexible hose 66.

Prior to moving the mold from molding station 14, clamping frame 26 is released from the periphery of the sheet, lifted from the mold and positioned for receiving a subsequent sheet of foam material at heating station 10. Although the shaped sheet is effectively maintained under vacuum in dimensionally fixed configuration on the shaping surface after removal of the clamping frame by the air tight seal created at the peripheral edge 58 of the mold, the loose edges of the sheet conveniently may be taped or otherwise secured to the periphery of support box 30 to prevent inadvertent displacement of the edges during subsequent coating and rigidizing operations.

At coating station 14 the exposed surface of the foam sheet on the mold is coated with a flowable, rigidizeable layer of resinous material, such as a thermosetting polyester resin containing glass fibers. Such coating may be applied by a conventional resin and fiber spray gun 71, well known in the art, in which fibrous material, in roving form, is continuously chopped and simultaneously combined into a spray of thermosetting resin directed onto the exposed surface of the sheet from the gun 71. At coating station 14, one or more layers of coating material may be applied and smoothed by hand rollers on the surface of the sheet to obtain a coating of desired thickness.

Upon completion of the coating operation, the mold containing the coated sheet under vacuum is rolled to rigidizing station 16 where heat is applied, as by heat lamps 72, to accelerate the cure and bonding of the thermosetting coating to the foam surface. Upon completion of cure, the mold containing the rigidized cushioned bathtub is rolled to product removal station 20 where flexible hose 66 is uncoupled from auxiliary valve 64 to release vacuum on the sheet and permit removal of the rigidized cushioned bathtub product. The peripheral edges of the tub are trimmed of excess material and suitable drain and overflow openings cut into the tub for the reception of conventional fittings.

As can be understood from the foregoing detailed description, the method and molding apparatus of the present invention may be empolyed to produce various rigid cushioned articles rapidly and efficiently on a commercial scale operation. By providing a plurality of portable vacuum molds of desired configuration, each connected to a vacuum source by individual flexible hoses, the molds can be simultaneously transported, under vacuum in assembly line fashion to the various treating stations to produce rigid cushioned articles in a rapid and efficient manner. By maintaining vacuum on the mold throughout the molding, coating, and rigidizing operations, the drapable cushioned sheets may be shaped and properly maintained in the desired configuration until bonded to and rigidized by the resinous support coating.

For economy of power consumption, the initial vacuum and shaping of the cushioned sheet may be accomplished by connection of the vacuum mold to a vacuum pump of high capacity, and subsequent maintenance of the vacuum on the mold during the coating and rigidizing operations can be accomplished by use of an auxiliary vacuum pump of lower power consumption, as indicated in FIG. 1. However, the molds could be connected at all times to a common vacuum source by individual flexible hoses, if desired.

The method and apparatus of the present invention may be employed to shape and rigidize drapable sheets of any type construction and composition which are capable of being shaped into a desired configuration in a vacuum molding operation. Typically, in the production of cushioned articles, the sheets may be composed of a soft, resiliently deformable resinous foam such as the commercially known polyolefin, polyurethane, and polyvinylchloride foam materials. In the construction of bathware products, excellent results have been obtained by employing as the cushioning sheet a closed cell foam layer composed of a blend of nitrile rubber and polyvinylchloride having a water-impervious film of polyvinylchloride laminated to the mold contacting surface of the foam to provide a smooth outer surface for the cushion layer in the final product.

That which is claimed is:

1. A method of manufacturing a large rigid article having a cushioned surface employing an assembly line having spaced treating stations including a molding station for shaping cushioned sheet material in a vacuum forming operation, a coating station for applying a flowable, rigidizable material to an exposed surface of the shaped cushioned sheet, and a rigidizing station for rigidizing and bonding the flowable material to the exposed surface of the shaped sheet, comprising the steps of a. providing a formable, drapable sheet of resiliently deformable cushioning material which does not become self-supporting in shape after forming;
b. applying the sheet to the exposed shaping surface of a portable, vacuum forming mold while drawing a vacuum on the mold to intimately conform the sheet to the shaping surface;
c. transporting the mold containing the sheet under vacuum thereon to the spaced coating station;
d. coating the exposed surface of the sheet on the mold with a bondable, rigidizable layer of resinous material while continuously maintaining vacuum on the mold to retain the sheet in intimate contact with the molding surface of the mold;
e. transporting the mold with the sheet and rigidizable layer while the mold remains under vacuum to the spaced rigidizing station to solidify the rigidizable layer and bond it to the surface of the sheet;
f. removing the vacuum from the mold; and
g. thereafter removing the rigid article from the molding surface of the mold.

2. A method as defined in claim 1 wherein the drapable sheet of cushioning material comprises a thermally formable sheet of plastic foam material having a water-impervious face, and wherein the sheet is conformed to the shaping surface of the vacuum forming mold by applying the water-impervious face of the sheet to the shaping surface of the mold while drawing a vacuum thereon.

3. A method as defined in claim 1 wherein the resinuous layer comprises a mixture of fibers in a thermosetting liquid resin and is coated on the sheet by spraying the mixture on the exposed surface of the on the mold.

4. A method as defined in claim 1 wherein the rigidifying layer is coated on the surface of the sheet by spraying.

5. A method of manufacturing a large rigid article having a resiliently deformable, cushioned surface comprising the steps of a. providing a formable, drapable sheet of resiliently deformable cushioning material;
b. applying the sheet to the exposed shaping surface of a vacuum forming mold while initially drawing a vacuum on the mold by connecting the mold to a primary source of vacuum to intimately conform the sheet to the shaping surface of the mold;
c. connecting the mold to an auxiliary source of vacuum to continuously maintain vacuum on the mold while transporting the mold under vacuum with the sheet in fixed dimensional configuration thereon to spaced treating stations;
d. continuously maintaining vacuum on the mold at said spaced treating stations to retain the sheet in dimensionally fixed configuration on the shaping surface of the mold while intimately bonding a rigid support layer to the exposed surface of the sheet at said spaced treating stations by coating the exposed surface of the sheet with a flowable, bondable layer of thermosetting resinous material and curing the resinous material to rigidize and intimately bond the layer to the sheet; and
e. releasing vacuum on the mold to permit removal of the rigid cushioned article therefrom.

* * * * *

UNITED STATES PATENT AND TRADEMARK OFFICE
CERTIFICATE OF CORRECTION

PATENT NO. : 4,102,964
DATED : July 25, 1978
INVENTOR(S) : Louis H. Ridgeway

It is certified that error appears in the above-identified patent and that said Letters Patent are hereby corrected as shown below:

In claim 3, column 6, line 4, after "surface of the", insert --sheet--.

Signed and Sealed this

Sixteenth Day of January 1979

[SEAL]

Attest:

RUTH C. MASON
*Attesting Officer*

DONALD W. BANNER
*Commissioner of Patents and Trademarks*